(12) United States Patent
Boström et al.

(10) Patent No.: US 7,588,289 B2
(45) Date of Patent: Sep. 15, 2009

(54) VEHICLE SEAT

(75) Inventors: Ola Boström, Alingsås (SE); Lennart Simonsson, Vågardå (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/886,480

(22) PCT Filed: Mar. 10, 2006

(86) PCT No.: PCT/SE2006/000310

§ 371 (c)(1),
(2), (4) Date: Sep. 17, 2007

(87) PCT Pub. No.: WO2006/101431

PCT Pub. Date: Sep. 28, 2006

(65) Prior Publication Data

US 2008/0164731 A1   Jul. 10, 2008

(30) Foreign Application Priority Data

Mar. 24, 2005   (GB) ................... 0506125.4

(51) Int. Cl.
*B60N 2/427* (2006.01)
*B60N 2/48* (2006.01)

(52) U.S. Cl. ................................ 297/216.12

(58) Field of Classification Search ........... 297/216.12, 297/216.14, 408, 216.13, 216.19, 216.18, 297/216.16; 180/274, 281
See application file for complete search history.

(56) References Cited

U.S. PATENT DOCUMENTS

| | | | | |
|---|---|---|---|---|
| 5,927,804 A | * | 7/1999 | Cuevas | 297/216.12 |
| 6,019,424 A | * | 2/2000 | Ruckert et al. | 297/216.12 |
| 6,196,580 B1 | | 3/2001 | Eberle et al. | |
| 6,250,714 B1 | * | 6/2001 | Nakano et al. | 297/216.12 |
| 6,331,014 B1 | * | 12/2001 | Breed | 280/730.1 |
| 6,375,262 B1 | * | 4/2002 | Watanabe | 297/284.4 |
| 6,474,733 B1 | * | 11/2002 | Heilig et al. | 297/216.12 |
| 6,478,373 B1 | * | 11/2002 | Hake et al. | 297/216.13 |
| 6,550,865 B2 | * | 4/2003 | Cho | 297/408 |

(Continued)

FOREIGN PATENT DOCUMENTS

EP   1 270 316 A2   1/2003

(Continued)

OTHER PUBLICATIONS

International Search Report for PCT/SE2006/000310, dated Jun. 20, 2006.

(Continued)

*Primary Examiner*—David Dunn
*Assistant Examiner*—James Alex
(74) *Attorney, Agent, or Firm*—Harness, Dickey & Pierce, P.L.C.

(57) ABSTRACT

A vehicle seat 1 comprises a squab (2) and a backrest (3). The headrest (4) is carried by the backrest. The headrest 4 is provided with a mechanism (7) to move the headrest forwardly in the event that an impact should occur. A locking mechanism (9) is provided to lock the headrest to prevent forward movement of the headrest in response to a predetermined signal. The signal may be generated in response to a rear impact in excess of a predetermined severity.

19 Claims, 3 Drawing Sheets

U.S. PATENT DOCUMENTS

Figure 1:
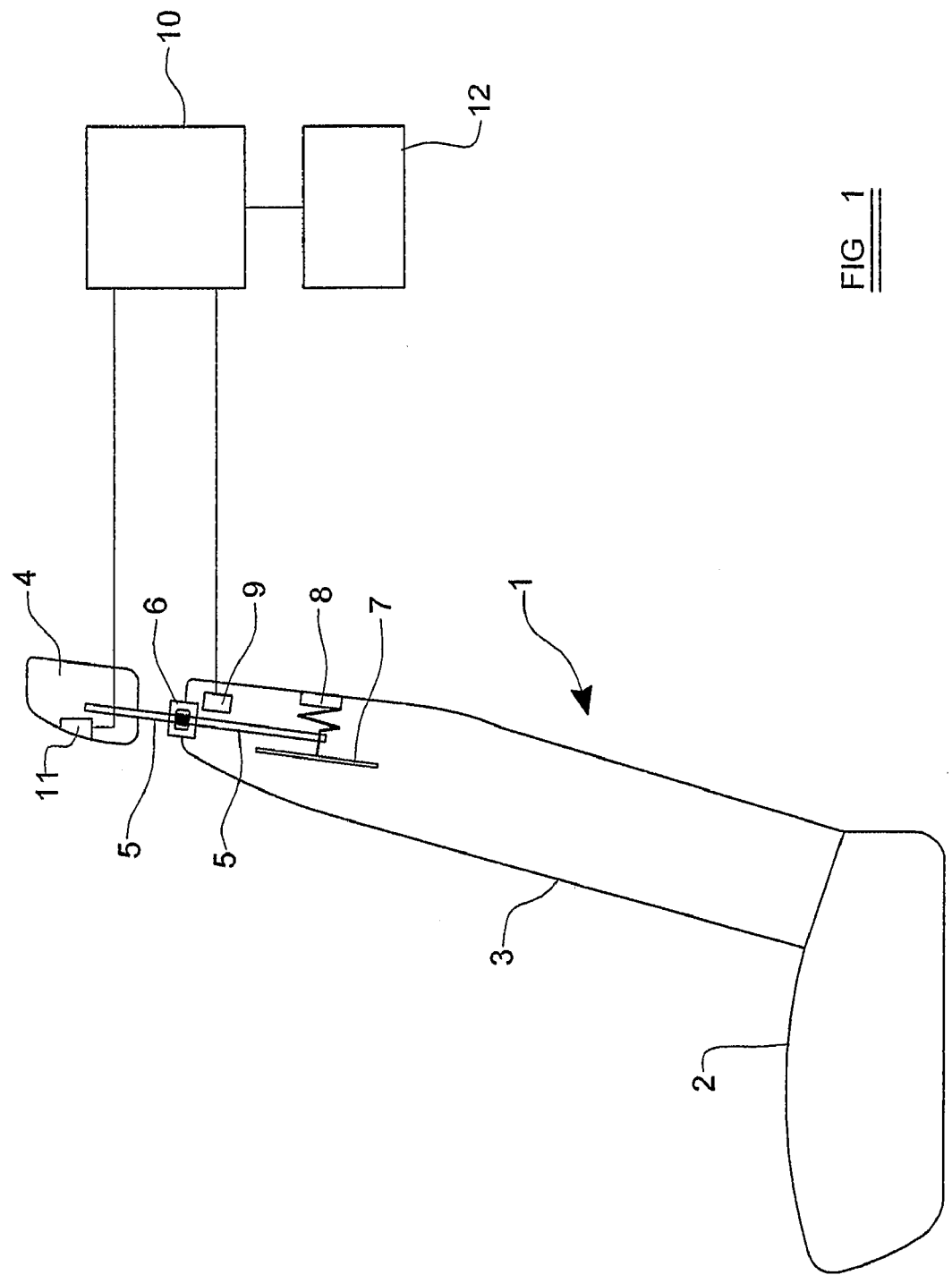

| | | | |
|---|---|---|---|
| 6,568,753 B1 | 5/2003 | Watanabe | |
| 6,607,242 B2* | 8/2003 | Estrada et al. | 297/216.12 |
| 6,805,404 B1* | 10/2004 | Breed | 297/216.12 |
| 6,938,953 B2* | 9/2005 | Håland et al. | 297/216.14 |
| 6,983,989 B1* | 1/2006 | Veine et al. | 297/216.12 |
| 6,983,996 B2* | 1/2006 | Svantesson | 297/408 |
| 7,077,472 B2* | 7/2006 | Steffens, Jr. | 297/216.13 |
| 7,188,894 B2* | 3/2007 | Humer et al. | 297/216.13 |
| 7,325,869 B2* | 2/2008 | Braune | 297/216.12 |
| 2002/0093231 A1 | 7/2002 | Estrada et al. | |
| 2002/0195846 A1* | 12/2002 | Masuda et al. | 297/216.12 |
| 2003/0015898 A1* | 1/2003 | Breed | 297/216.12 |
| 2003/0030316 A1* | 2/2003 | Cho | 297/408 |
| 2004/0012234 A1* | 1/2004 | Yamaguchi et al. | 297/216.12 |
| 2004/0070240 A1* | 4/2004 | Håland et al. | 297/216.12 |
| 2004/0239160 A1* | 12/2004 | Thunnissen et al. | 297/216.12 |
| 2004/0245814 A1* | 12/2004 | Lee | 297/216.12 |
| 2004/0245833 A1* | 12/2004 | Svantesson | 297/408 |
| 2005/0127726 A1* | 6/2005 | Schilling et al. | 297/216.12 |
| 2006/0267384 A1* | 11/2006 | Fischer et al. | 297/216.12 |
| 2007/0241593 A1* | 10/2007 | Woerner | 297/216.12 |
| 2008/0073951 A1* | 3/2008 | Hattori et al. | 297/216.12 |

FOREIGN PATENT DOCUMENTS

| | | |
|---|---|---|
| GB | 2 402 057 A | 12/2004 |
| WO | WO-02/058959 A1 | 8/2002 |
| WO | WO-2005/073019 A1 | 8/2005 |

OTHER PUBLICATIONS

Written Opinion for PCT/SE2006/000310.
Search Report for GB 0506125.4, dated Jul. 29, 2005.

* cited by examiner

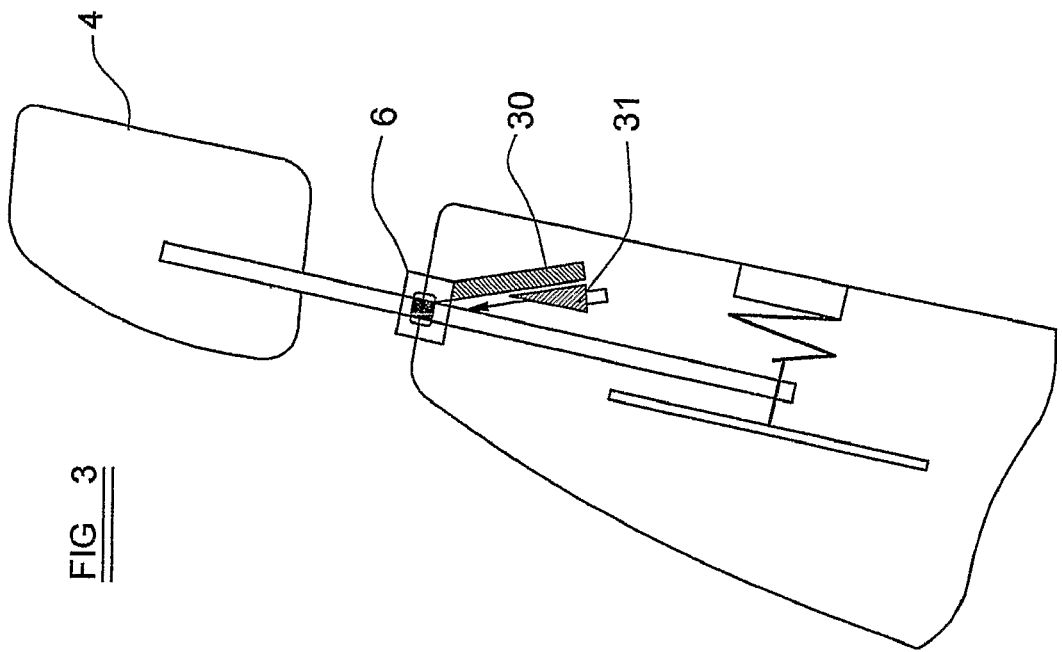
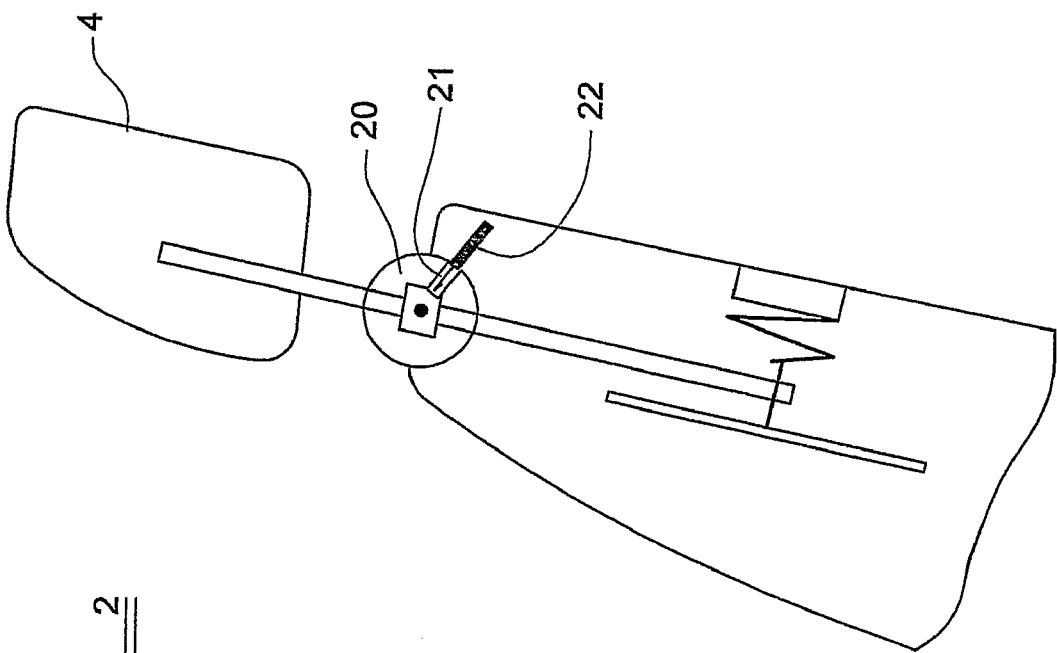

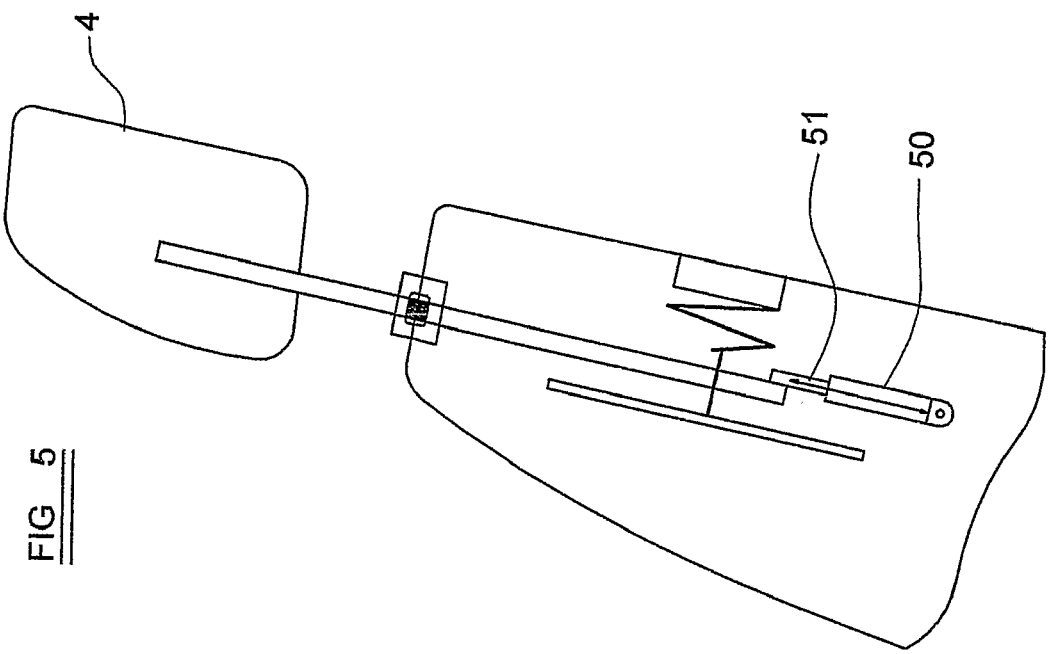
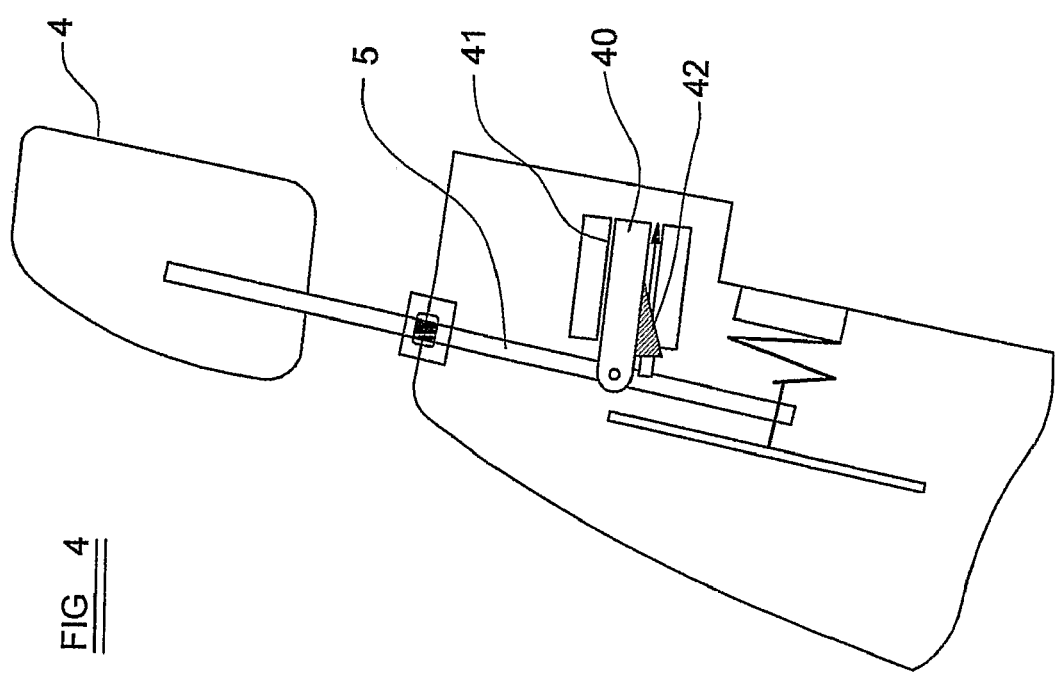

VEHICLE SEAT

The present invention relates to a vehicle seat and more particularly relates to a vehicle seat intended to provide protection for a seat occupant in the event that a rear impact accident should occur.

A rear impact accident can occur if, for example, one vehicle is stationary, and a second vehicle hits the stationary vehicle from the rear. Such accidents can occur in situations of poor visibility.

Such accidents can lead to severe injuries for the occupant of the front vehicle, in the form of whiplash injuries.

If we consider a seat occupant sitting in a stationary vehicle, the buttocks and lower back of the seat occupant are firmly in engagement with the squab and seat-back of the vehicle, but the head of the occupant is typically positioned in front of the headrest. When the vehicle in which the occupant is sitting is subjected to a very sudden and very high level acceleration from the rear, the seat in the vehicle moves forwardly with a very substantial acceleration. As the seat moves forwardly so the buttocks and lower thorax of the seat occupant move forwardly, but the head of the seat occupant, which is not in contact with any part of the vehicle, remains stationary.

A situation thus exists in which the lower part of the seat occupant is moving forwardly relatively swiftly whilst the head of the seat occupant remains stationary. This causes the neck of the seat occupant to twist, as the lower part of the neck moves forwardly and the upper part of the neck remains stationary. Eventually the situation is such that the head of the seat occupant is accelerated, by a force applied to the head through the neck. The initial action is that the head of the seat occupant tends to rotate about a horizontal axis and then the head of the seat occupant moves forwardly, with a "whip" like action. This can cause substantial damage to the neck of the seat occupant.

It has been proposed, consequently, to provide a vehicle seat with a headrest, in which the headrest will move forwardly to engage the rear part of the head of a seat occupant in the event that a rear impact should occur. With a seat of this type, when the head of the occupant has been engaged by the headrest, the head of the occupant is accelerated with an acceleration which is substantially identical to the acceleration being imparted to the buttocks and lower thorax of the seat occupant, and thus there is no relative displacement between the head and the upper part of the chest of the seat occupant. In this way the risk of "whiplash" injuries can be substantially reduced.

However, it has been found that in arrangements in the type in which the headrest moves forwardly, should the occupant of the vehicle be sitting with this head in contact with the headrest, then injuries can arise if the headrest suddenly moves forwardly with a substantial acceleration.

In some prior proposed arrangements the forward motion of the headrest is related to the severity of the rear impact. For example, in one prior proposed arrangement as shown in EP 1,026,029, the headrest is pivotally mounted about a pivot axis adjacent the top of the backrest of the seat, and a pressure plate is provided within the backrest which is connected, through the pivot axis, to the headrest. In a rear impact situation the torso of the occupant will exert a reactive force against the pressure plate, forcing the pressure plate rearwardly and, as a consequence of the pivotal mounting of the headrest, moving the headrest itself forwardly. The pressure applied to the pressure plate, and consequently the forward acceleration applied to the headrest, is dependent upon the severity of the accident, and should the rear impact be a very high energy impact, the headrest can be provided with such a high forward acceleration that the headrest itself injures the head of the seat occupant.

The present invention seeks to provide an improved vehicle seat.

According to this invention there is provided a vehicle seat, the seat comprising a squab and a backrest, the backrest carrying a headrest, the headrest being provided with a mechanism to move the headrest forwardly in the event that a rear impact should occur, wherein the seat incorporates a locking mechanism operative to lock the headrest to prevent forward movement of the headrest in response to a predetermined signal.

Preferably a head sensor is provided to generate a signal when the head of a seat occupant is in contact with or in close proximity to the headrest, the output of the sensor being used to generate the said predetermined signal.

Conveniently the seat is associated with a rear impact sensor configured to generate a signal when a rear impact in excess of a predetermined severity is detected, the output of the sensor being used to generate the said predetermined signal.

Advantageously the headrest is mounted on a support, the support being pivotally mounted to rotate pivotally about a substantially horizontal pivot axis at or adjacent the upper part of the backrest of the seat, the support carrying a pressure element within the backrest of the seat which is responsive to force applied to the backrest of the seat by a seat occupant to move the headrest.

Preferably the pressure element is associated with a damper to damp movement of the pressure plate.

Conveniently the headrest is associated with a locking element which rotates with the headrest as the headrest moves forwardly, the locking element defining a locking groove, there being a locking member which is moveable from an initial position to a locking position, the locking member engaging the groove when in the locking position to lock the locking element and to prevent forward movement of the headrest.

Alternatively the locking arrangement includes a locking member in the form of a wedge, the locking member being moveable to a locking position in which it engages a fixed locking element and a component which moves with the headrest as the headrest moves forwardly.

Preferably the locking member, when in the locking position, engages the locking element and part of the headrest support which is pivotally mounted in position.

Alternatively again the locking member is a wedge provided to engage a locking element, the wedge being movable to a locking position within a locking housing to wedge the locking element in position and prevent movement of the headrest.

Preferably the locking element is mounted on part of the support which supports the headrest and which moves pivotally on forward movement of the headrest.

In yet another alternative embodiment the locking member is moveable from a retracted position to a locking position in which it engages and prevents movement of part of the support of the headrest.

In one embodiment the locking member is provided with a gas piston to move the locking member to the locking position.

In an alternative embodiment the locking member is provided with a pyrotechnic unit to move the locking member to the locking position.

In a further embodiment the locking member is associated with an electro-magnet to move the locking member to the locking position.

Alternatively again the locking member is spring-biased towards the locking position, and is retained out of the locking position by means of a releasable detent.

Preferably the headrest is mounted on a support, the support being associated with or including a yieldable element configured to yield when the headrest is subjected to a substantial force when the locking member is in the locking position, to enable to headrest to move while absorbing energy.

Conveniently the pressure element is associated with or includes a yieldable element configured to yield when the pressure element is subjected to a substantial force and the locking member is in the locking position.

In order that the invention may be more readily understood, and so that further features thereof may be appreciated, the invention will now be described, by way of example, with reference to the accompanying drawings in which:

FIG. 1 is a diagrammatic view of a seat in accordance with the invention illustrating a headrest locking arrangement schematically, the figure being part diagrammatic and part block diagram, FIG. 2 is a view of part of one embodiment of the invention illustrating one locking arrangement, FIG. 3 is a view of part of another embodiment of the invention illustrating an alternative locking arrangement, FIG. 4 is a view of part of a further embodiment of the invention illustrating a further locking arrangement, and FIG. 5 is a view of yet a further embodiment of the invention illustrating yet another locking arrangement.

Referring initially to FIG. 1 a vehicle safety seat 1 comprises a squab 2, a backrest 3 and a headrest 4 which is carried above the top of the backrest. In this embodiment of the invention the headrest 4 is carried by a support 5, the support 5 engaging a pivotal connection 6 which defines a horizontal pivoting axis adjacent the top of the backrest 6. The support 5 continues within the backrest of the seat, the support 5 carrying a pressure plate 7 located within the upper part of the backrest of the seat. The lower end of the support 5 is associated with a damper 8.

At this stage it is to be appreciated that in a rear impact situation, when an occupant is present within the seat 1, the back of the occupant will be pressed into the backrest of the seat as the seat accelerates forwardly, and thus pressure will be applied to the pressure plate 7. The pressure applied to the pressure plate 7 will cause the lower end of the support 5 to move rearwardly, causing the support 5 to pivot about the pivotal axis 6 defined at the upper part of the backrest of the seat, and thus causing the headrest 4 to move forwardly. The movement is damped by the damper 8. The forward movement of the headrest 4 is such that the headrest will be brought into contact with the rear part of the head of a seat occupant before the lower part of the torso of the seat occupant has been moved forwardly sufficiently to cause a relative displacement between the upper part of the torso and the head which might give rise to severe whiplash injuries.

In embodiments of the invention, a locking arrangement 9 is associated with the headrest and the associated support, shown schematically in FIG. 1, to lock the headrest in position and to prevent pivotal movement of the headrest about the horizontal axis defined by the pivotal mounting 6 at the top of the backrest. The locking arrangement 9 is controlled by a controller 10. The controller 10 receives signals from two sensors.

A first sensor, sensor 11 is mounted within the headrest and is a contact sensor responsive to contact of the head with the headrest 4. The sensor 11 may also be a proximity sensor adapted to respond to the headrest being located relatively close to the head, for example being spaced from the head by a distance which may be measured as, at most, a few centimetres. Thus the sensor 11 is a head sensor which is responsive to the head being in contact with or close proximity to the headrest 4.

The second sensor, sensor 12 is a rear impact sensor, and in particular is a rear impact sensor which is responsive to rear impacts having severity in excess of a predetermined threshold.

It is thus to be understood, from a consideration of FIG. 1, that in a rear impact situation if the head of the seat occupant is in contact with, or very close to the headrest 4, the locking arrangement 9 will be actuated in response to a signal from the controller 10 preventing the headrest from moving forwardly with a pivotal action and similarly, in a very high energy or very severe rear impact, again the locking arrangement will be activated.

Many different types of locking arrangement may be utilised, some of which will be described below with reference to FIGS. 2 to 5.

Referring initially to FIG. 2 of the accompanying drawings, a locking disc 20 is carried by the support 5, the locking disc 20 having a centre co-aligned with the horizontal pivot axis defined by the pivotal mounting 6. The locking disc 20 defines a radially extending locking groove 21 which extends to the periphery of the locking disc. A locking member 22 is provided, initially mounted in position adjacent the periphery of the locking disc 20 in alignment with the locking groove 21. With the locking member 22 in this position the headrest can move about the horizontal pivot axis. The locking member 22 may be driven to extend partly into the locking disc 20, in response to a signal from the controller 10, thus preventing the locking disc 20 from turning and consequently preventing the headrest from moving forward. The locking member 22 may be moved to the locking position by means of a gas piston, which may be controlled by a pyrotechnic charge, or may be moved forwardly electro-magnetically, or in any other convenient manner. The locking member may be biased to its locking position by means of a spring, being retained by a releasable detent.

Instead of using a locking member in the form of a locking pin as shown with reference to FIG. 2, the wedge arrangement may be used, as shown in FIG. 3. FIG. 3 illustrates a rigid locking element 30 provided within the backrest of the seat, the element 30 being in the form of a plate extending downwardly at an angle to the vertical from the pivotal connection 6. A locking member in the form of a wedge element 31 is provided, which may be moved to a position in which one face of the wedge engages the locking element 30 and another face of the wedge engages the support arm 5 in such a way that rotation of the support arm about the horizontal pivot axis 6 to cause the headrest to move forwardly is prevented. Again the wedge 31 may be moved by a gas piston which may be actuated by a pyrotechnic charge, or may be moved electro-magnetically. The wedge element may be initially biased to a position in which free pivoting of the headrest is permitted, in the manner generally described above with reference to FIG. 1, by means of a spring or the like. Alternatively, the wedge may be spring-biased towards the position in which rotation of the headrest about the horizontal pivot axis is prevented, and is held in the initial retracted or "unlocking" position by means of a releasable detent. The releasable detent may be released by an electro-magnet.

FIG. 4 illustrates an alternative form of locking arrangement which incorporates the wedge. In the embodiment of FIG. 4 the lower part of the support arm 5 carries a horizontally extending locking element 40 which is pivotally connected to the locking arm 5. The locking element 40 extends through a locking housing 41, the locking housing 41 defining a through-passage which is dimensioned to receive the locking member, and which permits the locking member to slide freely through the housing 41. A locking member in the form of a wedge 42 is provided which can be driven to a position in which the wedge is forced into the housing, as shown in FIG. 4, the wedge serving to jam the locking element 40 within the housing 41 and thus preventing pivotal movement of the headrest about the horizontal pivot axis defined by the pivot mounting 6. The wedge 42 may again be moved from an initial retracted position to the operative wedging position by a variety of different mechanisms including a gas piston, a pyrotechnic unit, an electro-magnet, or a spring-biased arrangement and an associated releasable detent.

FIG. 5 illustrates yet a further form of locking arrangement. In the embodiment of FIG. 5 a locking unit 50 is provided, the locking unit comprising a generally cylindrical housing containing with it an axially extendible locking member 51. The locking member 51 may be moved from an initial retracted position in which the headrest is free to move to a locking position, as shown in FIG. 5, in which the locking member is extending from the housing, with the locking member then engaging part of the support 5 of the headrest, so as to prevent pivotal movement of the headrest. The housing 50 may contain a gas spring, a pyrotechnic unit, or an electro-magnetic unit to drive the locking member to the extended position or may have a spring-biasing the locking member to the extended position which is held within the housing by means of a releasable detent.

Once the headrest has been locked in position, the headrest will be unable to move rearwardly. In order to prevent the headrest imparting injury to the head of an occupant, when the head of the occupant strikes the headrest with a substantial force, part of the support 5 or an element associated with the support, such as a component within the pivotal mounting 6, is formed to be yieldable so that, should the headrest be subjected to a substantial force when the locking member is in the locking position, the headrest will be able to move rearwardly whilst absorbing energy. In this way the risk of the headrest itself imparting injury to the seat occupant is minimised or obviated.

In the described embodiment, once the headrest has been locked in position, the pressure plate 7 will also be locked in position. If the vehicle is involved in a very substantial rear impact, the pressure element may be driven forwardly to engage the spine of the seat occupant with a substantial force, giving rise to a risk that injury might occur. In order to prevent injury arising in such a situation it is preferred that the pressure plate is associated with or includes a yieldable element configured to yield when the pressure plate is subjected to a substantial force and the locking member is in the locking position. The yieldable element may be provided in many different positions. The support 5 which carries the pressure plate may be made of a yieldable material. The pivotal connections 6 may be made to yield when subjected to a high force. A supplementary pressure plate may be mounted on the front of a main pressure plate, with the supplementary pressure plate being held at a desired position relative to the main pressure plate by a resilient element.

It is to be appreciated that a number of different locking arrangements may be utilised, but, in the described embodiment of the invention, in response to a severe rear impact or in response to a rear impact when the head of the seat occupant is in contact with or adjacent the headrest, the headrest is prevented from moving forwardly.

When used in this Specification and Claims, the terms "comprises" and "comprising" and variations thereof mean that the specified features, steps or integers are included. The terms are not to be interpreted to exclude the presence of other features, steps or components.

The invention claimed is:

1. A vehicle seat, comprising:
a squab;
a backrest carrying a headrest, the headrest being provided with a mechanism to move the headrest forwardly in the event of a rear impact;
a locking mechanism carried by the seat and operative to lock the headrest to prevent forward movement of the headrest in response to a predetermined signal; and
a rear impact sensor configured to sense the rear impact and generate the predetermined signal upon detecting that the rear impact exceeds a predetermined severity.

2. The seat according to claim 1, further comprising a head sensor operative to generate an output when the head of a seat occupant is proximate the headrest, the output of the head sensor being used to generate the predetermined signal.

3. The seat according to claim 1, wherein the headrest is mounted on a support, the support being pivotally mounted to rotate pivotally about a substantially horizontal pivot axis proximate an upper part of the backrest of the seat, the support carrying a pressure element within the backrest of the seat which is responsive to a force applied to the backrest of the seat by a seat occupant to move the headrest.

4. The seat according to claim 3, wherein the pressure element is associated with a damper to dampen movement of the pressure plate.

5. The seat according to claim 3, wherein the headrest is associated with a locking element which rotates with the headrest as the headrest moves forwardly, the locking element defining a locking groove, there being a locking member which is moveable from an initial position to a locking position, the locking member engaging the groove when in the locking position to lock the locking element and to prevent forward movement of the headrest.

6. The seat according to claim 3, wherein the locking mechanism includes a locking member in the form of a wedge, the locking member being moveable to a locking position in which it engages a fixed locking element and a component which moves with the headrest as the headrest moves forwardly.

7. The seat according to claim 6, wherein the locking member engages the locking element and part of the headrest support which is pivotally mounted in position when in the locking position.

8. The seat according to claim 3, wherein the locking mechanism includes a wedge provided to engage a locking element, the wedge being movable to a locking position within a locking housing to wedge the locking element in position and prevent movement of the headrest.

9. The seat according to claim 8, wherein the locking element is mounted on part of the support which supports the headrest and which moves pivotally on forward movement of the headrest.

10. The seat according to claim 5, wherein the initial position of the locking member is a retracted position and the locking position engages and prevents movement of part of the support of the headrest.

11. The seat according to claim 5, wherein the locking member is provided with a gas piston to move the locking member to the locking position.

12. The seat according claim 5, wherein the locking member is provided with a pyrotechnic unit to move the locking member to the locking position.

13. The seat according to claim 5, wherein the locking member is associated with an electro-magnet to move the locking member to the locking position.

14. The seat according to claim 5, wherein the locking member is spring-biased towards the locking position, and is retained out of the locking position by a releasable detent.

15. The seat according to claim 5, wherein the support is associated with a yieldable element configured to yield when the headrest is subjected to a predetermined force when the locking member is in the locking position to enable the headrest to move while absorbing energy.

16. The seat according to claim 3, wherein the pressure element is associated with a yieldable element configured to yield when the pressure element is subjected to a predetermined force and the locking member is in the locking position.

17. A vehicle seat comprising:
a squab;
a backrest;
a headrest carried by the backrest, the headrest provided with a mechanism to move the headrest forwardly in the event of a rear impact;
a locking element associated with the headrest and operative to rotate with the headrest as the headrest moves forwardly, the locking element defining a locking groove;
the mechanism including a locking member moveable, by a pyrotechnic unit in response to a predetermined signal, from an initial position to a locking position, the locking member engaging the groove when in the locking position to lock the locking element and to prevent forward movement of the headrest, the predetermined signal being generated from an output from a head sensor, the predetermined signal being generated by the head sensor when a head of a seat occupant is proximate the headrest; and
a rear impact sensor configured to generate the predetermined signal upon detecting that the rear impact exceeds a predetermined severity.

18. A seat for a vehicle comprising:
a headrest connected to the seat through a support, the support being normally moveable from a first position to a second position;
a pressure plate coupled to the support to pivot the support from the first position to the second position and forwardly advance the headrest;
a locking mechanism carried by the seat and operative to prevent movement of the support to the second position in response to a locking signal; and
a first sensor configured to sense a rear impact to the vehicle and generate the locking signal upon detecting that the rear impact exceeds a predetermined severity, whereby the locking mechanism is normally unlocked to permit forward movement of the headrest and locked when the rear impact exceeds the predetermined severity.

19. The seat for the vehicle of claim 18, wherein a second sensor configured to sense when a head of the seat occupant is proximate the headrest and generate the locking signal.

\* \* \* \* \*